US009581989B2

United States Patent
Li et al.

(10) Patent No.: US 9,581,989 B2
(45) Date of Patent: Feb. 28, 2017

(54) CONTROL DEVICE OF MACHINE TOOL WHICH ESTIMATES OVERHEATING OF MOTOR

(71) Applicant: FANUC CORPORATION, Yamanashi (JP)

(72) Inventors: Geng Li, Yamanashi (JP); Tadashi Okita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 53 days.

(21) Appl. No.: 14/753,442

(22) Filed: Jun. 29, 2015

(65) Prior Publication Data

US 2016/0008938 A1   Jan. 14, 2016

(30) Foreign Application Priority Data

Jul. 9, 2014   (JP) .................................. 2014-141754

(51) Int. Cl.
  *G05D 23/00* (2006.01)
  *G05B 19/00* (2006.01)
  (Continued)

(52) U.S. Cl.
  CPC ............. *G05B 19/00* (2013.01); *H02H 6/005* (2013.01); *H02K 11/25* (2016.01);
  (Continued)

(58) Field of Classification Search
  CPC ............... H02P 29/0044; H02P 29/005; H02P 29/0061; H02P 29/0088; H02P 29/60;
  (Continued)

(56) References Cited

U.S. PATENT DOCUMENTS 4,980,624 A * 12/1990 Bernhardt ................ H02H 6/00
                                                                318/434
5,539,601 A    7/1996 Farag
(Continued)

FOREIGN PATENT DOCUMENTS

CN   102549910 A   7/2012
CN   103368499 A   10/2013
(Continued)

OTHER PUBLICATIONS

English Translation for Abstract of Japanese Publication No. 2012249383, published Dec. 13, 2012, 1 page.
(Continued)

*Primary Examiner* — Eduardo Colon Santana
*Assistant Examiner* — Bickey Dhakal
(74) *Attorney, Agent, or Firm* — Fredrikson & Byron, P.A.

(57) ABSTRACT

A control device of a machine tool which filters possible continued machining time data estimated from a value of current of a motor to thereby enable an accurate grasp of the time regardless of fluctuation of the load, that is, a control device of a machine tool which has a motor which drives a spindle, which control device of a machine tool can use a value of current of the motor, an overheat temperature of the motor, and a temperature of the motor to estimate the time until reaching the overheat temperature when the current operating current continues to be run through the motor, filter the estimated value of time by a filter to display a possible continued processing time, change a filter time constant based on either of a value of current and current command value, and accurately display the possible continued processing time even if the load fluctuates.

3 Claims, 12 Drawing Sheets

CALCULATING TIME CONSTANT FROM CURRENT COMMAND

(51) Int. Cl.
*H02P 29/00* (2016.01)
*H02H 6/00* (2006.01)
*B23Q 5/10* (2006.01)
*B23Q 17/00* (2006.01)
*H02H 7/085* (2006.01)

(52) U.S. Cl.
CPC ............ *H02P 29/0055* (2013.01); *B23Q 5/10* (2013.01); *B23Q 17/007* (2013.01); *H02H 7/0852* (2013.01)

(58) Field of Classification Search
CPC .......... H02P 29/62; H02P 29/64; H02P 29/66; H02P 29/68
USPC .................................. 318/641, 400.08, 792
See application file for complete search history.

(56) References Cited

U.S. PATENT DOCUMENTS

| | | | |
|---|---|---|---|
| 5,548,202 A | 8/1996 | Schramm et al. | |
| 2002/0159354 A1* | 10/2002 | Nakabayashi | G11B 33/144 369/53.18 |
| 2007/0132446 A1* | 6/2007 | Kleinau | B60L 15/025 324/160 |
| 2012/0299521 A1 | 11/2012 | Petersson et al. | |

FOREIGN PATENT DOCUMENTS

| | | |
|---|---|---|
| JP | 08182185 A | 7/1996 |
| JP | 2000271836 A | 10/2000 |
| JP | 2006211798 A | 8/2006 |
| JP | 2010206967 A | 9/2010 |
| JP | 2012249383 A | 12/2012 |
| WO | 2005093942 A1 | 10/2005 |
| WO | 2013145267 A1 | 10/2013 |

OTHER PUBLICATIONS

English Translation for Abstract of Japanese Publication No. 08182185, published Jul. 12, 1996, 1 page.
Abstract for EP Publication No. 0999630, published May 10, 2000, 1 page.
English Abstract for Japanese Publication No. 2000-271836 published Oct. 3, 2000, 1 pg.
English Abstract for Japanese Publication No. 2006-211798 A, published Aug. 10, 2008, 1 pg.
English Abstract for Japanese Publication No. 2010-206967 A, published Sep. 16, 2010, 1 pg.
English Abstract for Chinese Publication No. 102549910 A, published Jul. 4, 2012, 1 pg.
English Abstract for Chinese Publication No. 103368499 A, published Oct. 23, 2013, 1 pg.
English Abstract for International Publication No. WO 2013/145267 A1, published Oct. 3, 2013, 1 pg.

* cited by examiner

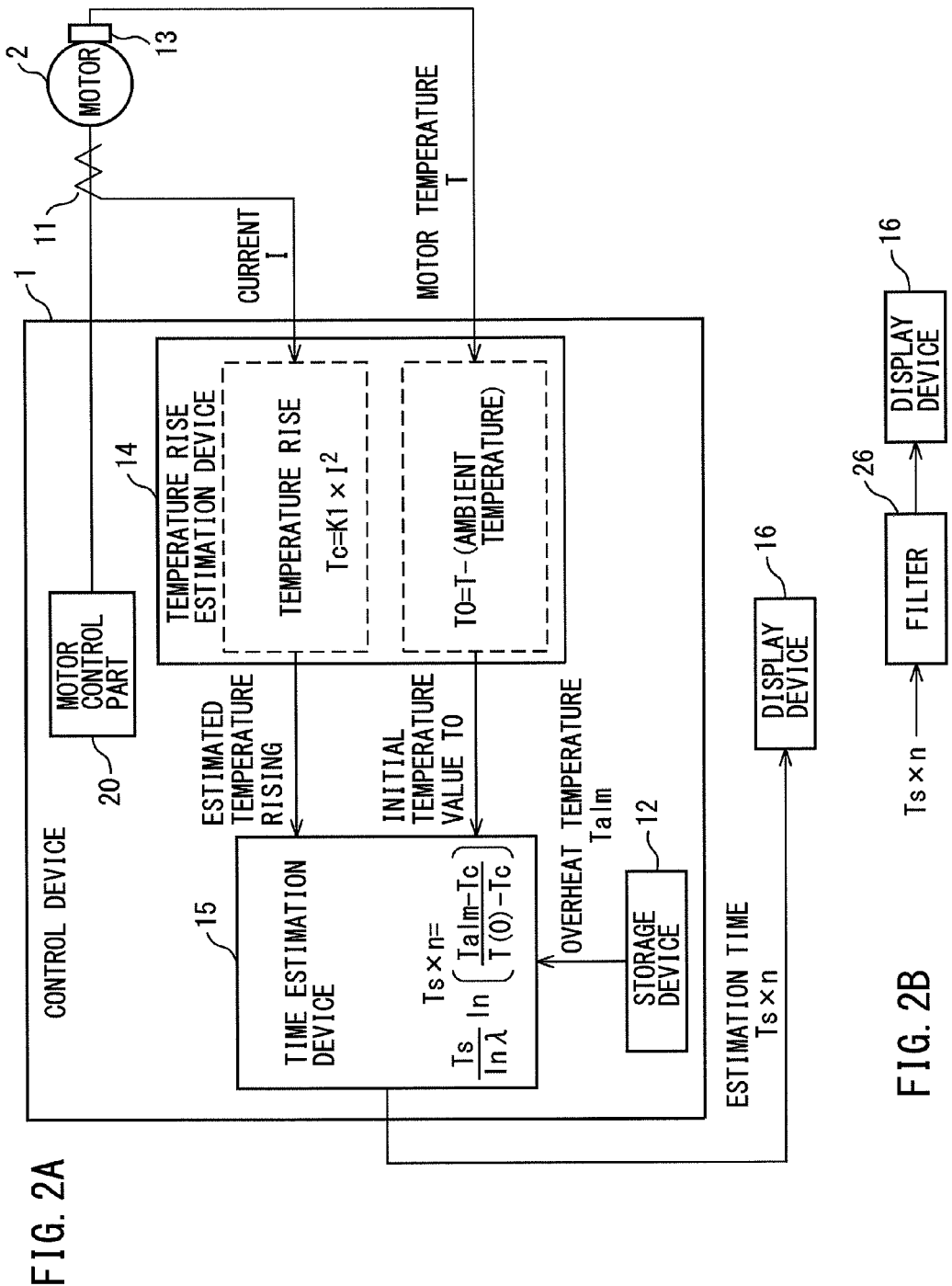

LARGE TIME CONSTANT OF FILTER

SMALL TIME CONSTANT OF FILTER

CALCULATING TIME CONSTANT FROM CURRENT COMMAND

SWITCH LARGE TIME CONSTANT TO SMALL AT LOAD GREAT CHANGE

CONTROL DEVICE OF MACHINE TOOL
WHICH ESTIMATES OVERHEATING OF
MOTOR

BACKGROUND OF THE INVENTION

1. Field of the Invention

The present invention relates to a control device of a machine tool which estimates overheating of a motor.

2. Description of the Related Art

When using a spindle of a machine tool for machining, usually it is used at or below a continuous rated load of the spindle motor. The "continuous rated load" is a load of a level where the motor will not overheat even if that load is continuously applied for an unlimited time so long as being used at that load or less. However, when performing heavy duty machining or when increasing the load for just a short time to shorten the processing time, sometimes a load exceeding the continuous rated load is given to operate the motor.

When applying a load exceeding the continuous rated load to a motor, a possible machining time is prescribed in accordance with that load. If continuing to apply a load for a time over this, the motor will end up overheating. Therefore, when applying a load exceeding the continuous rated load to a motor for performing processing, an indicator relating to exactly how much time the processing can be continued without the motor overheating when continuing to apply the current load becomes necessary.

In general, a graph which illustrates an allowable load characteristic which enables information on "how many minutes machining is possible until overheating if machining by a load n %" to be understood for each motor is prescribed for machining exceeding a continuous rated load. The operator performs machining with reference to the illustrated information. In the graph of the allowable load characteristic, the possible machining time corresponding to a load is prescribed. If referring to the graph of the allowable load characteristic, it will be understood how much time it will take for the motor to end up overheating if continuing to apply a certain load.

FIG. 1 is a view which illustrates one example of an allowable load characteristic of a motor. In FIG. 1, the abscissa indicates a motor speed, while the ordinate indicates a load which is applied to the motor. A load of 100% illustrates the continuous rated load. In that case, even if that load is continuously applied for an unlimited time, the motor will not overheat. In the example which is illustrated in FIG. 1, in the low speed rotation region, a 200% load is illustrated as the load which can be applied if machining for 2.5 minutes in a 10 minute cycle, while a 230% load is illustrated as the load which can be applied if machining for 1 minute in a 10 minute cycle. If applying a load exceeding the continuous rated load to make the motor continuously operate, the motor may generate heat exceeding the allowable amount of heat generation and break down.

To deal with this problem, for example, in the method and apparatus for control of a machine tool by numerical control which are disclosed in Japanese Patent Publication No. 2000-271836A, the amount of heat generation of a program as a whole is estimated from the expected values of heat generation of the motor at the time of fast speed of the feed shaft motor (non-machining) and the time of machining speed and the time constant is made to change so that the amount of heat generation becomes the allowable one or less. However, while the invention which is disclosed in Japanese Patent Publication No. 2000-271836A estimates the heat generation of the motor, it does not disclose for exactly how much time machining is possible until overheating.

Further, in a control device of a permanent magnet type synchronous motor which is disclosed in WO2005/093942, the loss which occurs at the motor (copper loss+iron loss) is found, the amount of the rated loss minus that loss is deemed the loss which can be consumed by the motor, and a d-axis current corresponding to this is run so as to prevent overload of the motor. However, in the invention which is disclosed in WO2005/093942, the loss including the iron loss is estimated, there is no disclosure of how much time remains during which machining is possible until overheating.

Therefore, the present applicant proposes preparing a formula for heat simulation which estimates the motor temperature from the value of current of the motor and providing a method of calculating this formula in reverse so as to estimate about how much time remains until the motor overheats, that is, about how much time remains during which continuous machining is possible.

However, in the method which the present applicant proposes, the possible continued machining time from the value of current is estimated, so if the value of current fluctuates slightly due to fluctuation of the machining load, the possible continued machining time will frequently fluctuate and therefore the time will be difficult to grasp.

SUMMARY OF THE INVENTION

In one aspect, an object of the present invention is to provide a control device of a machine tool which can estimate a possible continued machining time from a value of current of a motor, use a filter which has a predetermined time constant on the estimated possible continued machining time data, and obtain an accurate grasp of the time even when a steady load greatly fluctuates.

According to one aspect of the present invention, there is provided a control device of a machine tool which has a motor which drives a spindle, the control device of a machine tool comprising a current detection device which detects a value of current of the motor, a storage device in which an overheat temperature which is prescribed for the motor is stored, a temperature detection device which detects a temperature of the motor, a time estimation device which uses a temperature which is detected by the temperature detection device and the overheat temperature to estimate a time from a current point of time to when the motor reaches the overheat temperature in the case where a current which the current detection device detects continues to flow through the motor, a filter which filters the value of time which the time estimation device estimates, a time constant changing device which changes a filter time constant in the filter in accordance with either of a value of current and a current command value which is given when controlling the motor, and a display device which displays a value of time which the filter outputs.

According to a control device of a machine tool of the present invention, it becomes possible to estimate a possible continued machining time from a value of current of a motor, use a filter which has a predetermined time constant on the estimated possible continued machining time data, and obtain an accurate grasp of the time even when the load fluctuates.

BRIEF DESCRIPTION OF THE DRAWINGS

The present invention will be understood more clearly by referring to the drawings attached below.

FIG. 2A is a block diagram which illustrates a previously proposed control device of a machine tool.

FIG. 2B is a view which illustrates a configuration where a filter is provided at a front of a display device of a control device of a machine tool which is illustrated in FIG. 2A.

DETAILED DESCRIPTION

Figure 1:
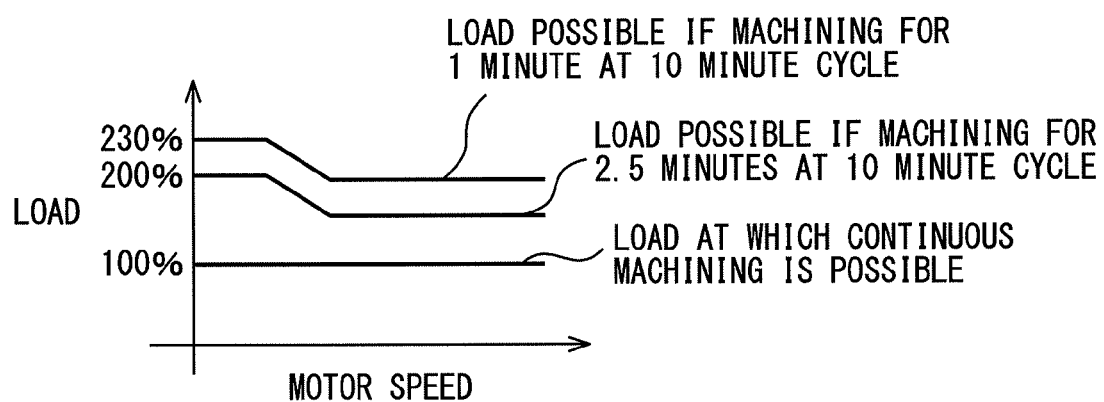
FIG. 1 is a view which illustrates one example of an allowable load characteristic of a motor.

Below, using the attached drawings, embodiments of the present invention will be explained in detail based on specific examples. Before explaining embodiments of the present invention, FIG. 2A, FIG. 2B, FIG. 3A, and FIG. 3B will be used to explain a method of estimation of a possible continued machining time from a value of current which is proposed by the present applicant. Note that, in the following explanation, attachment of the same reference notations in different drawings shall mean the components have the same functions.

FIG. 2A is a block diagram which illustrates one example of a control device 1 of a machine tool which is proposed by the present applicant. The control device 1 of the machine tool which has a motor which drives a spindle comprises a current detection device 11, a storage device 12, a temperature detection device 13, a temperature rise estimation device 14, a time estimation device 15, and a display device 16. The display device 16 is provided at the numerical control device of a machine tool and may also be provided at the control device 1 which is illustrated in FIG. 2A. Further, the control device 1 comprises a motor control part 20 which feeds current for driving the motor 2. The motor control part 20 uses the motor drive command which is received from a higher control device (not illustrated) as the basis to convert the AC power which is fed from the AC power supply to DC power for output, then further converts this to AC power for driving the motor 2 and feeds it to the motor.

The current detection device 11 detects the value of the current I which drives the motor 2. The storage device 12 stores in advance an overheat temperature Talm which is prescribed for the motor 2. The temperature detection device 13 detects a temperature T of the motor 2. The temperature rise estimation device 14 will be explained later. The time estimation device 15 uses the temperature T which is detected by the temperature detection device 13 and the overheat temperature Talm which is stored in the storage device 12 to estimate the time from the current point of time to when the motor 2 reaches the overheat temperature Talm in the case where the current I which the current detection device 11 detects continues to run through the motor 2. The display device 16 displays the time which is estimated by the time estimation device 15.

Next, the principle of operation of the control device 1 of a machine tool which is illustrated in FIG. 2A will be explained. Heat is generated by the motor 2 due to loss which is consumed by a winding of copper wire due to current which drives the motor 2 running through the winding of the motor 2, defined as "copper loss", and loss which is consumed by eddy current flowing to the core of the motor 2, defined as "iron loss". When driving the motor 2 at a low speed, the heat generation of the motor 2 is affected more by the copper loss rather than the iron loss.

Here, envisioning utilization for driving the motor 2 at a low speed, the iron loss is ignored and the time until reaching the overheat temperature Talm is estimated. The temperature rise due to copper loss of the motor 2 when a certain current I continues to flow through the motor 2 is proportional to the square of the current I. That is, the final temperature rise Tc at the motor 2 is expressed by the formula 1.

$$Tc = K1 \times I^2 \qquad (1)$$

In formula 1, K1 is found in advance by calculation in reverse from the temperature rise when a certain constant current is run through the motor 2. When the heat time constant of the motor 2 is τ and the sampling time is Ts, the temperature rise T(n) can be calculated by the recurrence formula which is shown in formula 2.

$$T(n) = \lambda \times T(n-1) + (1-\lambda) \times Tc \text{ where} \qquad (2)$$
$$\lambda = e^{\frac{T_s}{\tau}}$$

If cleaning up the recurrence formula which is shown in formula 2, formula 3 is obtained.

$$T(n) = \lambda^n \times (T(0) - Tc) + Tc \qquad (3)$$

In formula 3, T(0) is the initial value of the temperature rise T(n) of the motor 2. By prescribing T(0), it is possible to estimate the temperature rise T(n) of the motor 2 from formula 3. If further modifying formula 3, formula 4 is obtained.

$$n = \frac{1}{\ln \lambda} \times \ln\left(\frac{Talm - Tc}{T(0) - Tc}\right) \qquad (4)$$

Here, when, as the rise from the detected temperature T, when the overheat temperature is made Talm, if the initial value T(0) of the temperature rise at a certain point of time is known, the time "Ts×n" from the current point of time to when the motor 2 reaches the overheat temperature Talm in the case where the current I continues to flow through the motor 2 is expressed as shown in formula 5.

$$Ts \times n = \frac{Ts}{\ln \lambda} \times \ln\left(\frac{Talm - Tc}{T(0) - Tc}\right) \quad (5)$$

The temperature T is detected by the temperature detection device 13, while the current I which flows through the motor 2 is detected by the current detection device 11. Further, the temperature rise Tc due to the copper loss of the motor 2 when the current I which the current detection device 11 detects continues to flow through the motor 2 is estimated by the temperature rise estimation device 14 based on formula 1. Further, as the initial value T(0) of the temperature rise at a certain point of time, the difference between the temperature T near the motor 2 which is detected by the temperature detection device 13 and the ambient temperature of the machine tool which has the motor 2 is used.

Further, the time estimation device 15 uses the overheat temperature (rise) Talm which was stored in advance in the storage device 12, the temperature rise Tc due to the copper loss which was estimated by the temperature rise estimation device 14, and the difference between the temperature T which was detected by the temperature detection device 13 and the ambient temperature, defined as the initial value T(0) of the temperature rise, to calculate the time "Ts×n" from the current point of time to when the motor 2 reaches the overheat temperature Talm in the case where the current I continuously flows through the motor 2 based on formula 5. That is, the time estimation device 15 uses the temperature T which was detected by the temperature detection device 13, the overheat temperature Talm, and the temperature rise Tc due to the copper loss so as to calculate the time "Ts×n" from the current point of time to when the motor 2 reaches the overheat temperature Talm. The calculated time "Ts×n" is displayed by the display device 16.

In this regard, in the control device 1 which the present applicant previously proposed, the formula 5 was used to estimate the possible continued machining time from the value of current, so if fluctuation of the machining load caused the value of current to finely change, the possible continued machining time also frequently fluctuated and it became difficult to obtain a grasp of the time. Therefore, as illustrated in FIG. 2B, it may be considered to employ a primary filter 26 which has a predetermined time constant for the calculated possible continued machining time estimation value "Ts×n" at a stage before the display device 16. That is, it may be considered to display the output value (value of time) of the time estimation device 15 as the input of the filter 26 and the output value (value of time) of the filter 26 as the final possible continued machining time at the display device 16.

If employing the filter 26 at a stage before the display device 16 in this way, the display of the load/possible continued machining time can be kept from finely changing. In this regard, if employing the filter 26 at a stage before the display device 16, if the steady load greatly fluctuates, time is taken until the possible continued machining time which is really desired to be known is finally determined. This will be explained using FIG. 3A and FIG. 3B.

Figure 3A:
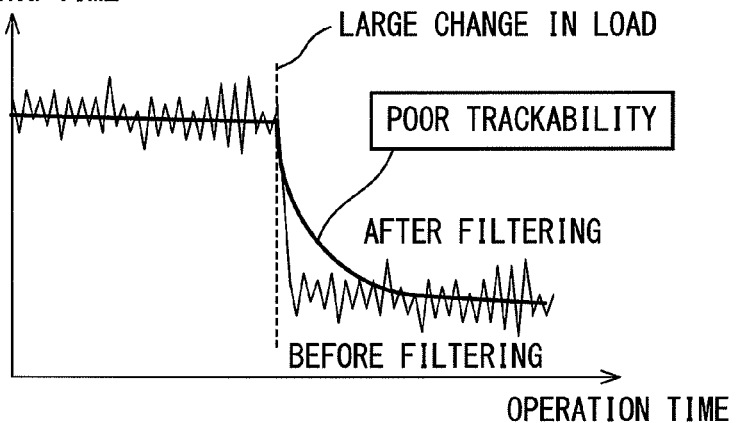
FIG. 3A is a view which illustrates one example of a possible continued machining time of a motor when a time constant of a filter which is illustrated in FIG. 2B is large.
Figure 3B:
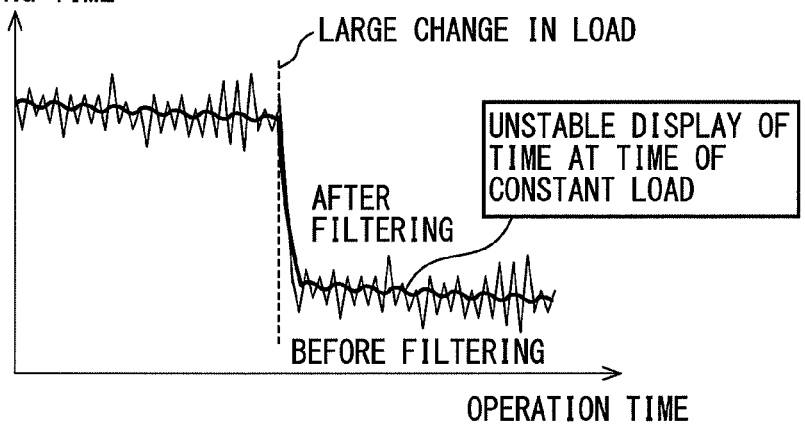
FIG. 3B is a view which illustrates one example of a possible continued machining time of a motor when a time constant of a filter which is illustrated in FIG. 2B is small.

As illustrated in FIG. 3A, if making the time constant of the filter 26 which is employed at the stage before the display device 16 larger, the tracking ability of the display of the load/possible continued machining time when the load greatly changes is poor. Further, as illustrated in FIG. 3B, when making the time constant of the filter 26 which is employed at a stage before the display device 16 smaller, the display of the load/possible continued machining time at the time of a steady load will not stabilize.

The present invention was made to solve this problem. Inside of the filter 26 at the stage before the display device 16, a time constant changing device which changes the time constant in accordance with the change of the value of current is provided. Due to this, even if fluctuations in the machining load cause the value of current to finely change and, further, even if the steady load greatly fluctuates, it is possible to provide a control device of a machine tool which makes it easy to obtain a grasp of the possible continued machining time. Below, this embodiment will be explained by several examples.

Figure 4A:
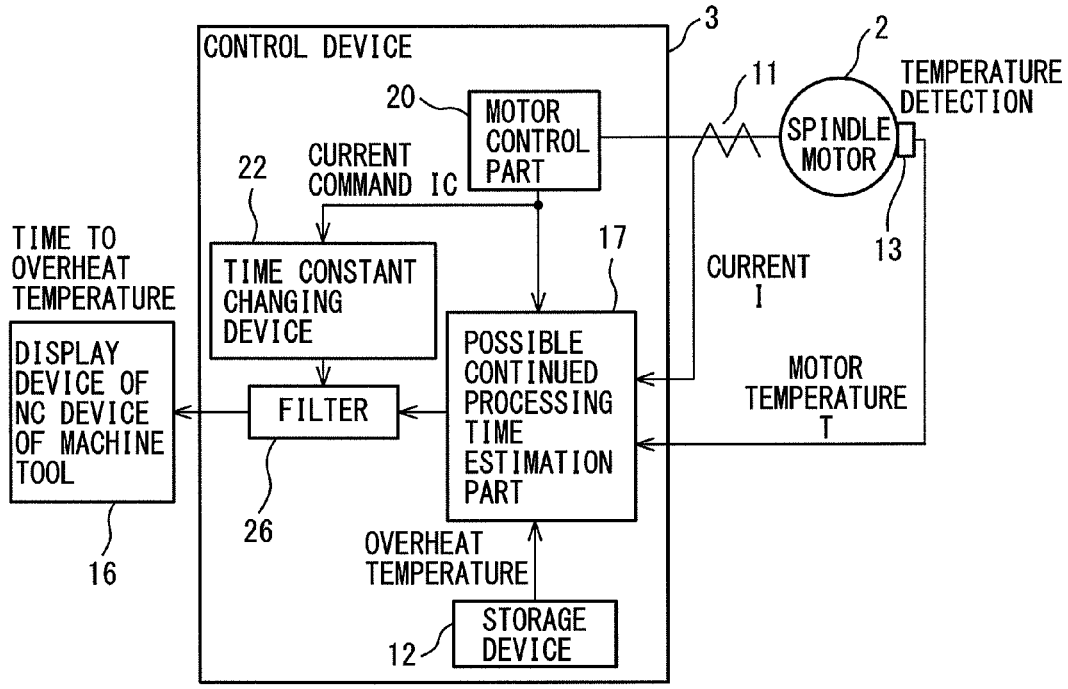
FIG. 4A is a block diagram which illustrates a control device of a machine tool according to a first embodiment of the present invention.

FIG. 4A illustrates a control device 3 of a machine tool according to a first embodiment of the present invention. The control device 3 of a machine tool which has a motor 2 which drives a spindle (in the following examples, referred to as the "spindle motor 2") is comprised of a current detection device 11, storage device 12, temperature detection device 13, possible continued processing time estimation part 17, motor control part 20, time constant changing device 22, and filter 26. A display device 16 of a numerical control device of a machine tool (below, simply referred to as the "display device") is provided at the outside of the control device 3 of a machine tool, but this display device 16 may also be provided at the control device 3 of the machine tool.

The motor control part 20 supplies current for driving the spindle motor 2. Based on a motor drive command (position command) which is received from a numerical control device (NC) or other higher control device (not illustrated), it converts AC power which is fed from an AC power supply to DC power which it then outputs, then further converts this to AC power for driving the motor 2 and supplies it to the motor. Further, the motor control part 20 outputs a current command value IC to the possible continued processing time estimation part 17 and the time constant changing device 22. The current detection device 11 detects the value of the current I which drives the motor 2. The storage device 12 stores in advance the overheat temperature Talm which is prescribed for the motor 2. The temperature detection device 13 detects the temperature T of the motor 2.

The possible continued processing time estimation part 17 is provided with both a temperature rise estimation function of the temperature rise estimation device 14 which was explained in FIG. 2A and a time estimation function of the time estimation device 15. The possible continued processing time estimation part 17 uses the time estimation function and uses the temperature T which the temperature detection device 13 detects and the overheat temperature Talm which is stored in the storage device 12 so as to estimate the time from the current point of time to when the spindle motor 2 reaches the overheat temperature Talm in the case where the current I which the current detection device 11 detects continues to run through the motor 2, that is, the possible continued processing time. The display device 16 displays the possible continued processing time which is estimated by the possible continued processing time estimation part 17.

On the other hand, the control device 3 of a machine tool according to the first embodiment of the present invention is connected to a filter 26 at the output of the possible continued processing time estimation part 17. The possible continued processing time which is estimated by the possible continued processing time estimation part 17 is input through the filter 26 to the display device 16. The filter 26 has a predetermined time constant, but this time constant can be changed by a time constant changing device 22 which is connected to the filter 26. The time constant changing device 22 can be built into the filter 26.

In the control device 3 of a machine tool according to the first embodiment, the time constant changing device 22 calculates a slant of the current command value IC from the motor control part 20. Further, if the result of calculation of the slant of the current command value IC at the time constant changing device 22 is a certain threshold or more, the filter 26 is set with a small time constant. Conversely, if the result of calculation of the slant of the current command value IC at the time constant changing device 22 is less than a certain threshold, the filter 26 is set with a large time constant. The filter 26 performs filtering using a time constant which is determined by the time constant changing device 22 and outputs the result to the display device 16.

Figure 4B:
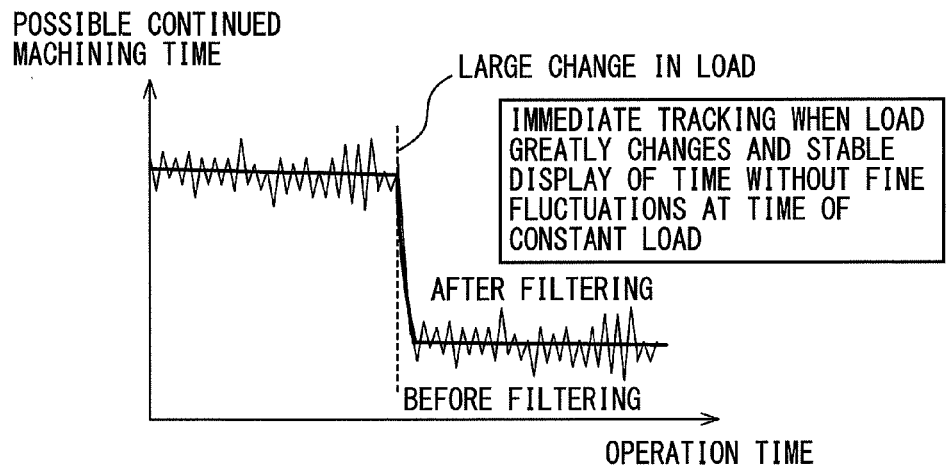
FIG. 4B is a view which illustrates one example of a possible continued machining time of a motor when changing a time constant of a filter which is illustrated in FIG. 4A.

If, like in the first embodiment, when the result of calculation of the slant of the current command value IC at the time constant changing device 22 is a certain threshold or more, the filter 26 is set with a small time constant, and when it is less than a certain threshold, the filter 26 is set with a large time constant, the possible continued processing time of the motor becomes as illustrated in FIG. 4B. Note that, FIG. 4B illustrates the possible continued processing time as the possible continued machining time. That is, the possible continued processing time (possible continued machining time) of the motor immediately tracks the load even if it greatly fluctuates. At the time of constant load, it is stable with no fine time fluctuations.

Figure 12:
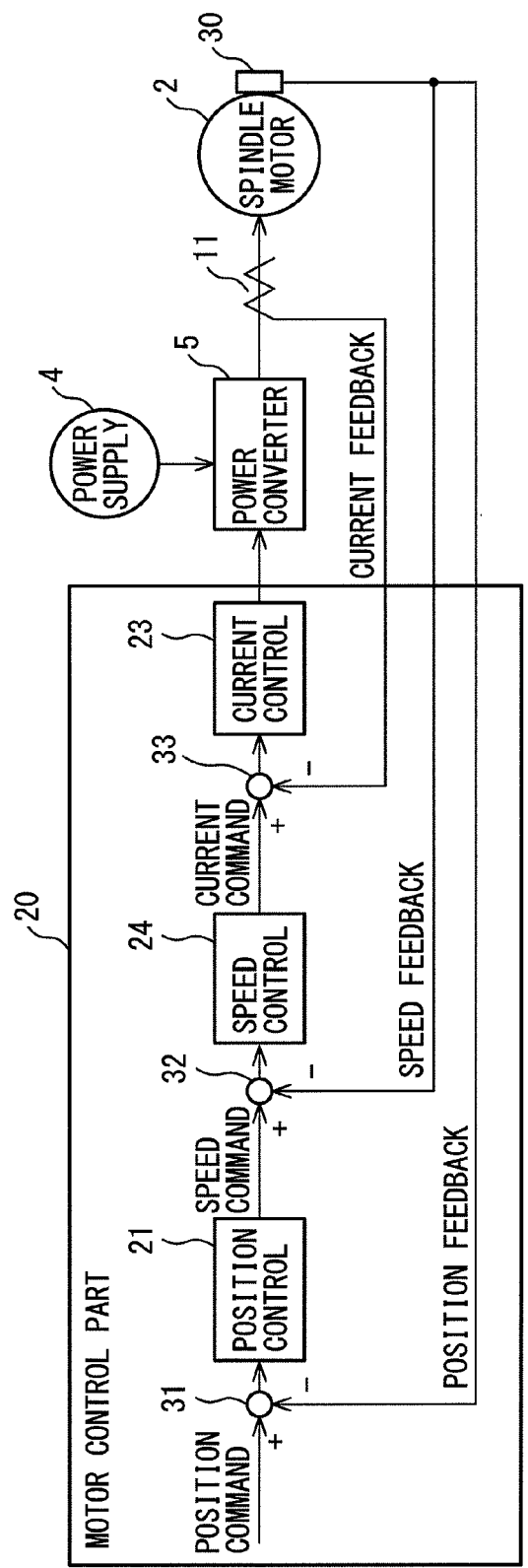
FIG. 12 is a block diagram which illustrates the configuration of a motor control device.

Note that, in the control device 3 of a machine tool which was illustrated in FIG. 4A, the configuration of the motor control part 20 is not explained in detail, but the motor control part 20 for example is provided with the configuration such as illustrated in FIG. 12. The motor control device 20 includes a position control part 21, speed control part 24, current control part 23, and subtractors 31, 32, 33. The subtractor 31 is arranged at a stage before the position control part 21. It subtracts from the position command from the higher device the detection value of the angle detection device 30 of the motor as a position feedback value and inputs the result to the position control part 21. The subtractor 32 is arranged at a stage before the speed control part 24. It subtracts from the speed command from the position control part 21 the amount of change between certain sampling periods of the detection value of the angle detection device 30 of the motor as a speed feedback value and inputs the result to the speed control part 24. The subtractor 33 is arranged at a stage before the current control part 23. It subtracts from the current command from the speed control part 24 the detection value of the current detection device 11 as a current feedback value and inputs the result to the current control part 23. Further, the output of the motor control device 20 is actually output through the power converter 5 which was connected to the power supply 4 to the spindle motor 2.

Figure 5:
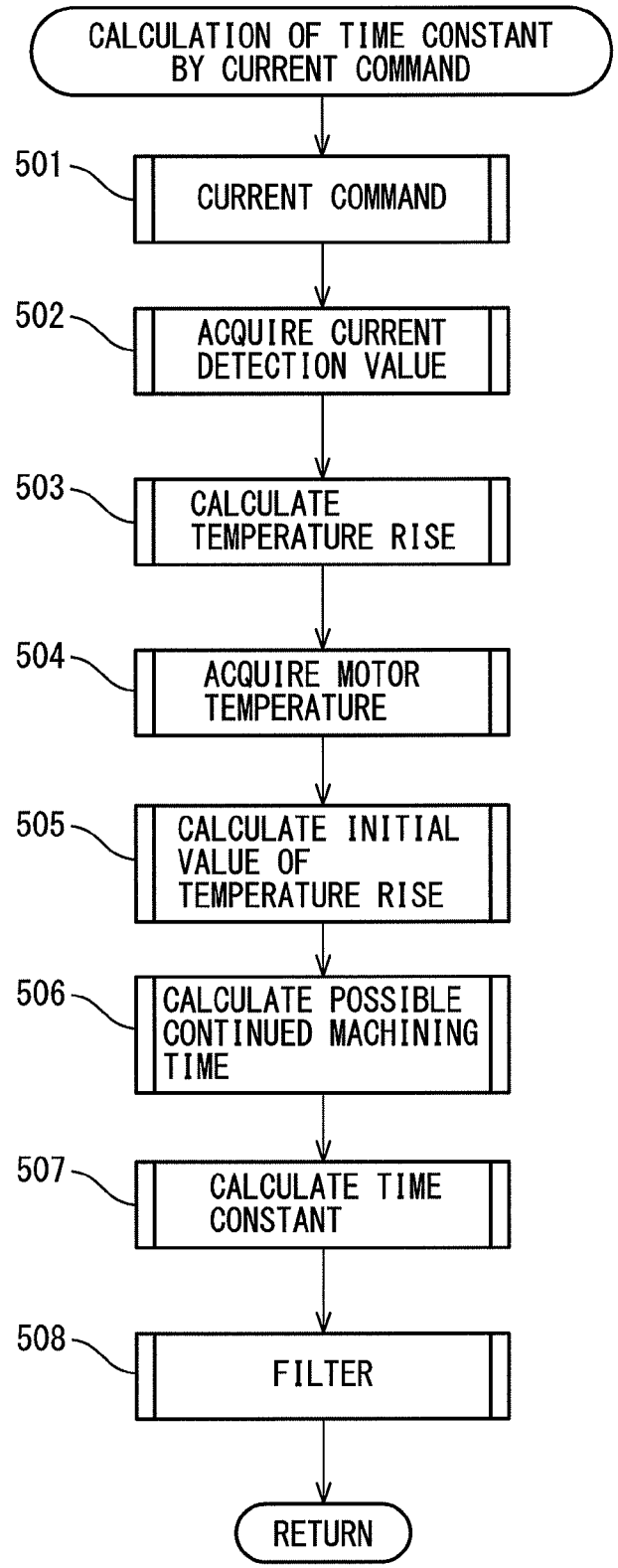
FIG. 5 is a flow chart which illustrates a time constant calculation routine of a control device of a machine tool according to a first embodiment of the present invention.

FIG. 5 is a flow chart which illustrates a time constant calculation routine of a control device 3 of a machine tool according to a first embodiment of the present invention. In the explanation of this flow chart, reference notations of members which are illustrated in FIG. 4A will be assigned for the explanation. First, at step 501, a position command is input from a higher control device to the motor control part 20. From the motor control part 20, a current command value IC is input to the possible continued processing time estimation part 17 and the time constant changing device 22. The possible continued processing time estimation part 17, at step 502, acquires a current detection value I which drives the spindle motor 2 from the current detection device 11. The possible continued processing time estimation part 17 next, at step 503, calculates and estimates the temperature rise Tc due to copper loss of the spindle motor 2 which occurs when the acquired current detection value I continues to flow through the spindle motor 2 based on the above formula 1.

Further, the possible continued processing time estimation part 17 acquires the temperature of the spindle motor 2 from the temperature detection device 13 at step 504 and calculates the difference between the motor temperature T which was detected by the temperature detection device 13 and the ambient temperature using the temperature rise initial value at a certain point of time as T(0) at step 505. Further, at step 506, the possible continued processing time estimation part 17 uses the overheat temperature (rise) Talm which was stored in advance in the storage device 12, the estimated temperature rise Tc due to the copper loss, and the difference between the motor temperature T which was detected by the temperature detection device 13 and the ambient temperature, defined as the temperature rise initial value T(0), to calculate the time "Ts×n" from the current point of time to when the spindle motor 2 reaches the overheat temperature Talm based on formula 5 in the case where the acquired current continues flowing through the spindle motor 2, that is, the possible continued processing time.

At step 507, the time constant changing device 22 which receives the current command value IC which was output from the motor control part 20 calculates the time constant. Further, at step 508, the possible continued processing time which was calculated at step 506 and the time constant which was calculated at step 507 are input to the filter 26. The possible continued processing time which was corrected by the filter 26 is provided to the display device 16.

Figure 6:
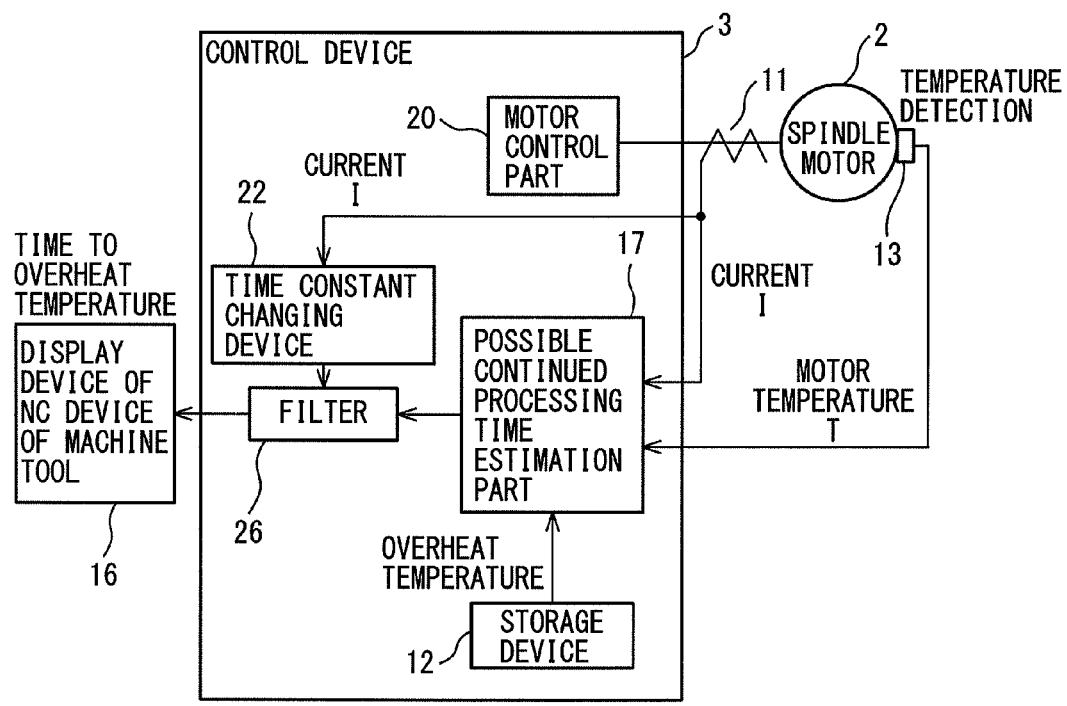
FIG. 6 is a block diagram which illustrates a control device of a machine tool according to a second embodiment of the present invention.

Next, the control device 3 of a machine tool of a second embodiment of the present invention which is illustrated in FIG. 6 will be explained. The configuration of the control device 3 of a machine tool of the second embodiment is the same as the control device 3 of a machine tool of the first embodiment which was explained in FIG. 4A except for the signals which are input to the time constant changing device 22. Therefore, the same reference notations are assigned to the same component members and the explanations are omitted.

In the control device 3 of a machine tool of the first embodiment, the time constant changing device 22 used the current command value which was input to the motor control part 20 as the basis to calculate the time constant which was set at the filter 26. On the other hand, in the control device 3 of a machine tool of the second embodiment, the time constant changing device 22 uses the current output value I which the current detection device 11 detected as the basis to calculate the time constant which was set at the filter 26.

Figure 7:
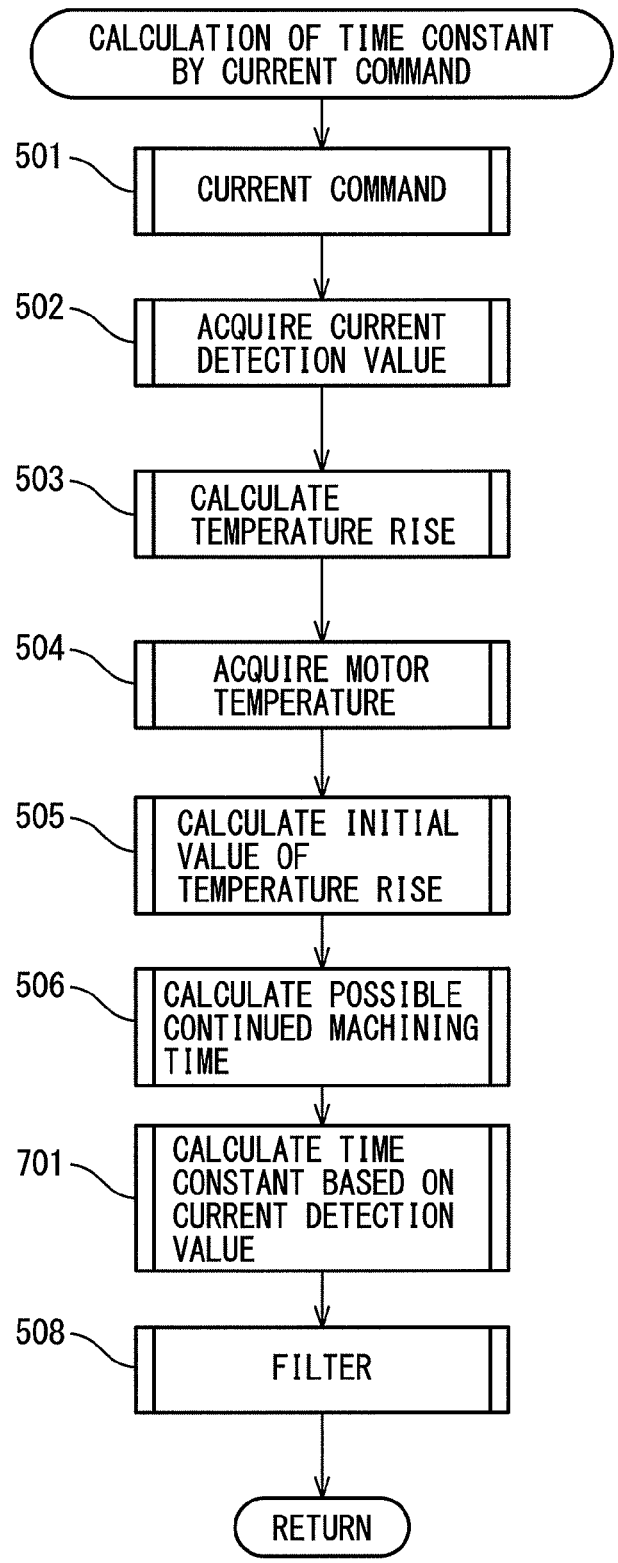
FIG. 7 is a flow chart which illustrates a time constant calculation routine of a control device of a machine tool according to a second embodiment of the present invention.

FIG. 7 is a flow chart which illustrates a time constant calculation routine of a control device of a machine tool according to the second embodiment of the present invention. In the explanation of the present flow chart, the reference notations of the members which are illustrated in FIG. 6 are assigned for the explanation. As explained above, the only point of difference of the control devices 3 of a machine tool of the first and second embodiments is the type of signals which are input to the time constant changing device 22. Therefore, in the flow chart which illustrates the time constant calculation routine of the control device 3 of a machine tool in the second embodiment, parts of the processing routine the same as the processing routine of the possible continued processing time estimation part 17 of the control device 3 of a machine tool in the first embodiment are assigned the same step nos. 501 to 506 and explanations are omitted.

At the first embodiment, at step 507, the time constant changing device 22 received the current command value IC which was output from the motor control part 20, then the time constant changing device 22 calculated the time constant. On the other hand, in the second embodiment, the current detection value I which drives the spindle motor 2 which the possible continued processing time estimation part 17 acquires from the current detection device 13 at step 502 is input to the time constant changing device 22, then at step 701 the time constant changing device 22 uses the acquired current detection value I as the basis to calculate the time constant. Further, at step 508, the possible continued processing time which was calculated at step 506 and the time constant which was calculated at step 701 are input to the filter 26, then the possible continued processing time which was corrected by the filter 26 is provided to the display device 16.

Figure 8:
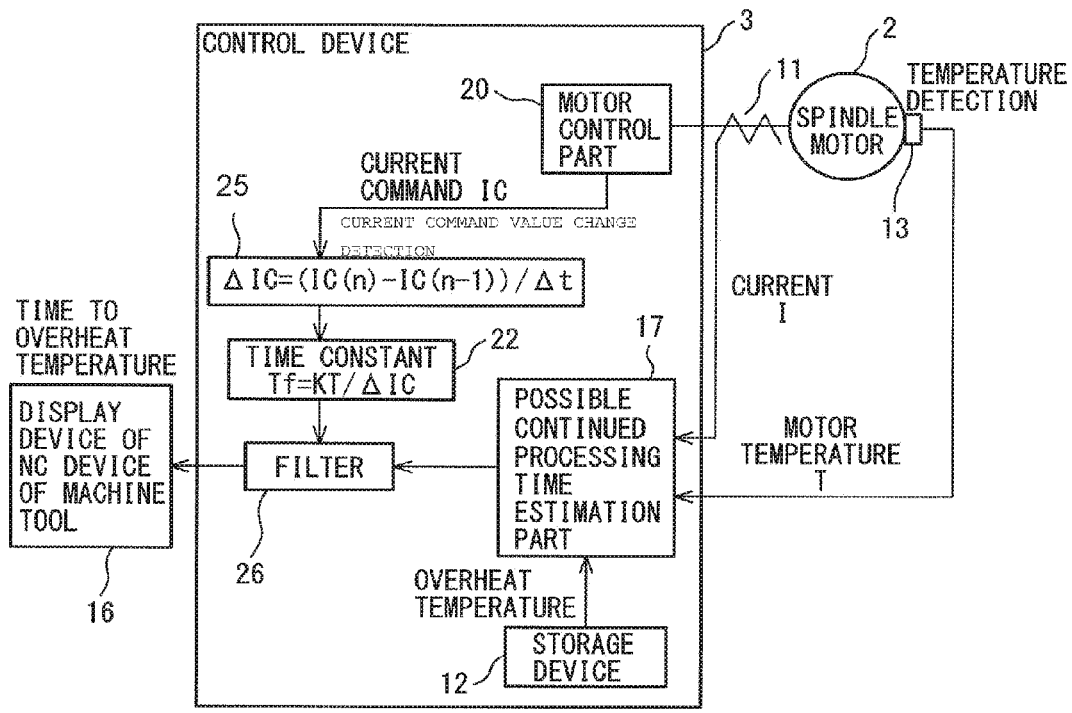
FIG. 8 is a block diagram which illustrates a control device of a machine tool according to a third embodiment of the present invention.

FIG. 8 illustrates the configuration of the control device of a machine tool according to a third embodiment of the present invention. The only point of difference of the control device 3 of a machine tool according to the third embodiment from the control device 3 of a machine tool of the first embodiment lies in the configuration at the stage before the time constant changing device 22. In the first embodiment, the current command value IC which is output from the motor control part 20 is input to the time constant changing device 22. The time constant changing device 22 uses the input current command value IC as the basis to calculate the time constant of the filter 26.

On the other hand, in the third embodiment, the current command value IC which is output from the motor control part 20 is input to the current command value change detection part 25 before being input to the time constant changing device 22. In FIG. 8, the current command value change detection part 25 is indicated as "$\Delta IC=(IC(n)-IC(n-1))/\Delta t$". The current command value change detection part 25 calculates the amount of change $\Delta IC$ of the current command value IC at a certain sampling point "n". The amount of change $\Delta IC$ of the current command value IC which is calculated at the current command value change detection part 25 is input to the time constant changing device 22.

Figure 9:
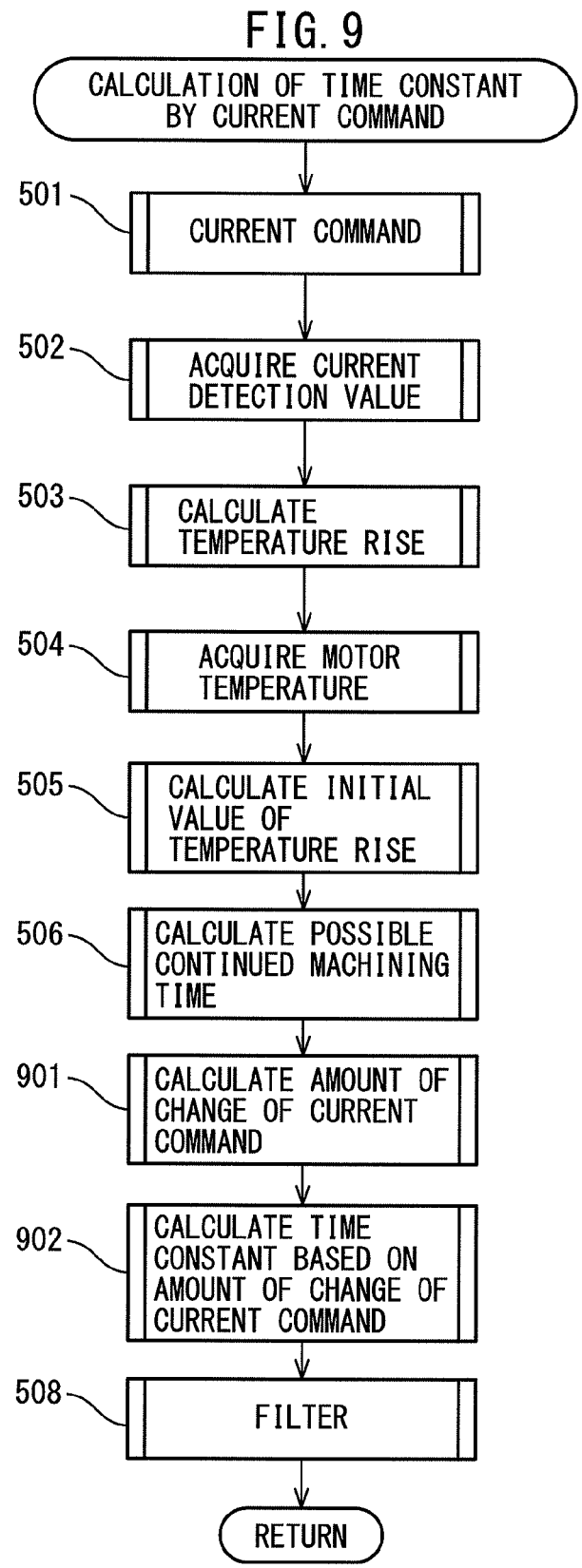
FIG. 9 is a flow chart which illustrates a time constant calculation routine of a control device of a machine tool according to a third embodiment of the present invention.

In FIG. 8, the time constant changing device 22 is indicated as the "time constant $Tf=KT/\Delta IC$". KT is a reference time constant. The time constant changing device 22 uses the amount of change $\Delta IC$ of the amount of change of the input current command value IC as the basis to calculate the time constant of the filter. However, in the flow chart which illustrates the time constant calculation routine of the control device of a machine tool according to the third embodiment which is illustrated in FIG. 9, the same parts of the processing routine as the processing routine of the possible continued processing time estimation part 17 of the control device 3 of a machine tool in the first embodiment are assigned the same step nos. 501 to 506 and explanations are omitted. Further, in the explanation of the present flow chart, the reference notations of the members which are illustrated in FIG. 8 are attached for the explanation.

In the first embodiment, at step 507, the time constant changing device 22 received the current command value IC which was output from the motor control part 20, then the time constant changing device 22 calculated the time constant. On the other hand, in the third embodiment, the current command value IC which is output from the motor control part 20 is received by the current command value change detection part 25 at step 901, the amount of change $\Delta IC$ of the current command value IC is calculated, then this is input to the time constant changing device 22. Further, at the next step 902, the time constant changing device 22 uses the acquired amount of change $\Delta IC$ of the current command value IC as the basis to calculate the time constant. Further, at step 508, the possible continued processing time which was calculated at step 506 and the time constant which was calculated at step 902 are input to the filter 26, while the possible continued processing time which was corrected by the filter 26 is provided with the display device 16.

In this way, the method of changing the time constant of the filter 26 by the time constant changing device 22 may be changed so as to be switched by a certain threshold such as in the first and second embodiments, but as explained in the third embodiment, it is possible to calculate the time constant for a certain reference time constant KT in the form of KT/(slant of current detection value) and continuously change the time constant of the filter 26.

Figure 10:
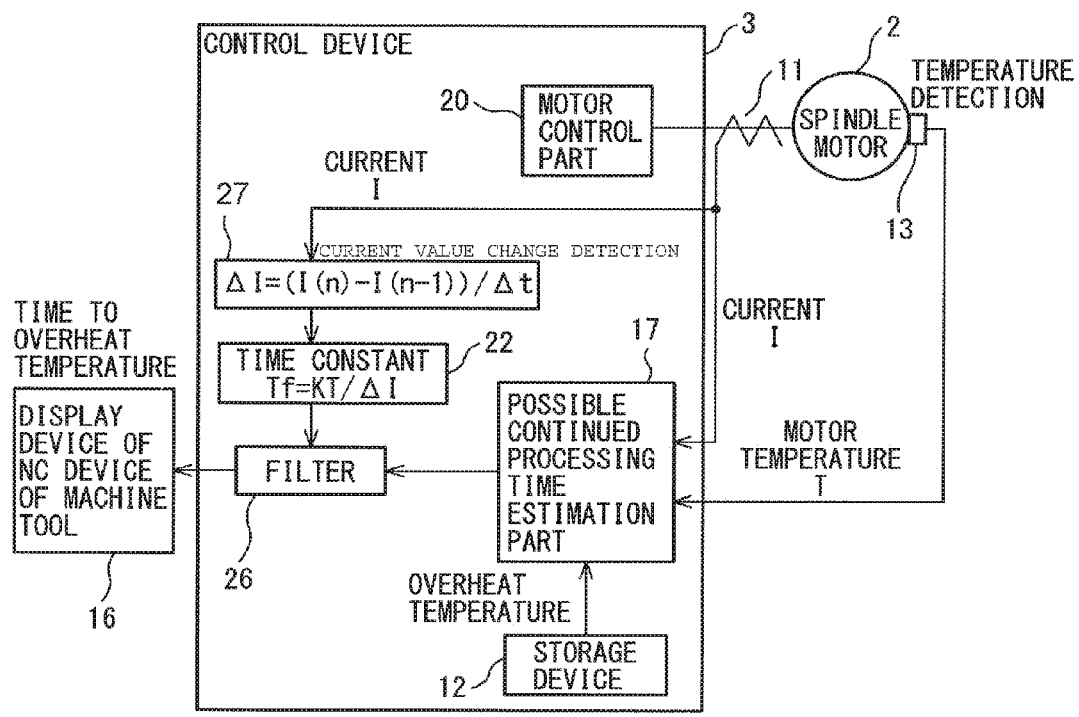
FIG. 10 is a block diagram which illustrates a control device of a machine tool according to a fourth embodiment of the present invention.

FIG. 10 illustrates the configuration of the control device of a machine tool according to a fourth embodiment of the present invention. The only point of difference of the control device 3 of a machine tool of the fourth embodiment from the control device 3 of a machine tool of the second embodiment is the configuration before the time constant changing device 22. In the second embodiment, the current detection value I which was output from the current detection device 11 was input to the time constant changing device 22, then the time constant changing device 22 used the input current detection value I as the basis to calculate the time constant of the filter.

On the other hand, in the fourth embodiment, the current detection value I which is output from the current detection device 11 is input to the current detection value change detection part 27 before being input to the time constant changing device 22. In FIG. 10, the current detection value change detection part 27 is indicated as "$\Delta I=(n)-I(n-1))/\Delta t$". The current detection value change detection part 27 calculates the amount of change $\Delta I$ of the current detection value I at a certain sampling point "n". The amount of change $\Delta I$ of the current detection value I which is calculated at the current detection value change detection part 27 is input to the time constant changing device 22.

Figure 11:
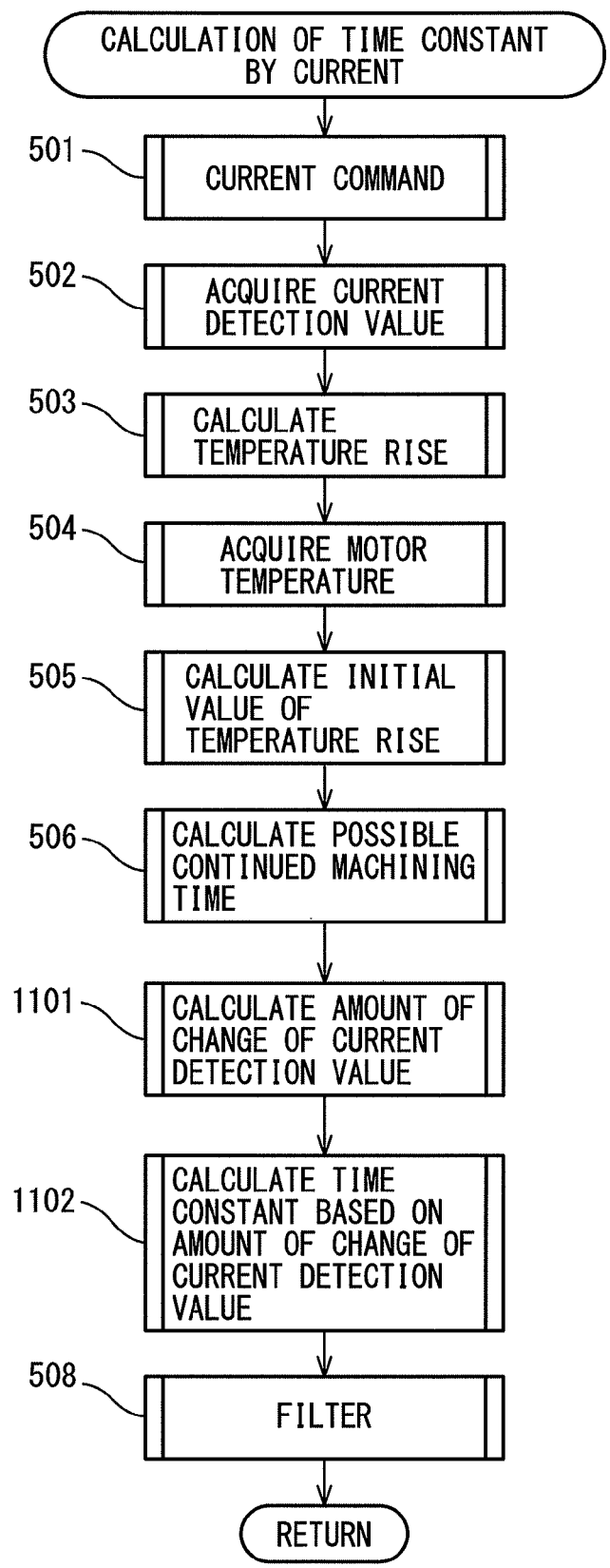
FIG. 11 is a flow chart which illustrates a time constant calculation routine of a control device of a machine tool according to a fourth embodiment of the present invention.

In FIG. 10, the time constant changing device 22 is indicated as the "time constant $Tf=KT/\Delta I$". KT is a reference time constant. The time constant changing device 22 uses the amount of change $\Delta I$ of the input current detection value I as the basis to calculate the time constant of the filter. Therefore, in the flow chart which illustrates the time constant calculation routine of the control device 3 of the machine tool according to the fourth embodiment which is illustrated in FIG. 11, the parts of the processing routine which are the same as the processing routine of the possible continued processing time estimation part 17 of the control device 3 of a machine tool in the second embodiment are assigned the same step nos. 501 to 506 and explanations are omitted. Here too, in the explanation of the flow chart, reference notations of the members which are illustrated in FIG. 10 are attached for the explanation.

In the second embodiment, at step 701, the time constant changing device 22 received the current detection value I which was output from the current detection device 11 and the time constant changing device 22 calculated the time constant. On the other hand, in the fourth embodiment, at step 1101, the current detection value I which is output from the current detection device 11 is received by the current detection value change detection part 27. The amount of change ΔI of the current detection value I is calculated and is input to the time constant changing device 22. Further, at the next step 1102, the time constant changing device 22 uses the acquired amount of change ΔI of the current detection value I as the basis to calculate the time constant. Further, at step 508, the possible continued processing time which was calculated at step 506 and the time constant which was calculated at step 1102 are input to the filter 26. The possible continued processing time which was corrected at the filter 26 is provided to the display device 16.

In this way, the method of changing the time constant of the filter 26 by the time constant changing device 22 may be changed so as to be switched by a certain threshold such as in the first and second embodiments, but as explained in the fourth embodiment, it is possible to calculate the time constant for a certain reference time constant KT in the form of KT/(slant of current detection value) and continuously change the time constant of the filter 26.

What is claimed is:

1. A control device of a machine tool comprising:
   a motor which drives a spindle,
   a current detection device which detects a value of current of said motor,
   a storage device in which an overheat temperature which is prescribed for said motor is stored,
   a temperature detection device which detects a temperature of said motor,
   a time estimation device which uses a temperature which is detected by said temperature detection device and said overheat temperature to estimate a time from a current point of time to when said motor reaches said overheat temperature in the case where a current which said current detection device detects continues to flow through said motor,
   a filter which receives as an input, the value of time which said time estimation device estimates,
   a time constant changing device which changes a filter time constant in said filter in accordance with either of a value of current and a current command value which is given when controlling the motor, and
   a display device which displays a value of time which said filter outputs, wherein time constant changing device decreases said filter time constant when either of said value of current or said current command value is a predetermined threshold value or more and increases said filter time constant when it is less than the predetermined threshold value.

2. The control device of a machine tool according to claim 1, wherein
   the control device further comprises either of a detection device of an amount of change of said value of current or a detection device of an amount of change of said current command value, and
   said filter changes the filter time constant in accordance with either of an amount of change of said value of current and said amount of change of said current command value.

3. The control device of a machine tool according to claim 2, wherein said time constant changing device has threshold values for an amount of change of the value of current per unit time and an amount of change of the current command value and judges either of the amount of change of the value of current per unit time or the amount of change of the current command value and
   decreases a filter time constant when said time constant changing device judges that either of the amount of change of the value of current per unit time or the amount of change of the current command value is larger than said threshold value and
   increases the filter time constant when it judges that either of the amount of change of the value of current per unit time or the amount of change of the current command value is smaller than said threshold value.

* * * * *